Mar. 6, 1923.

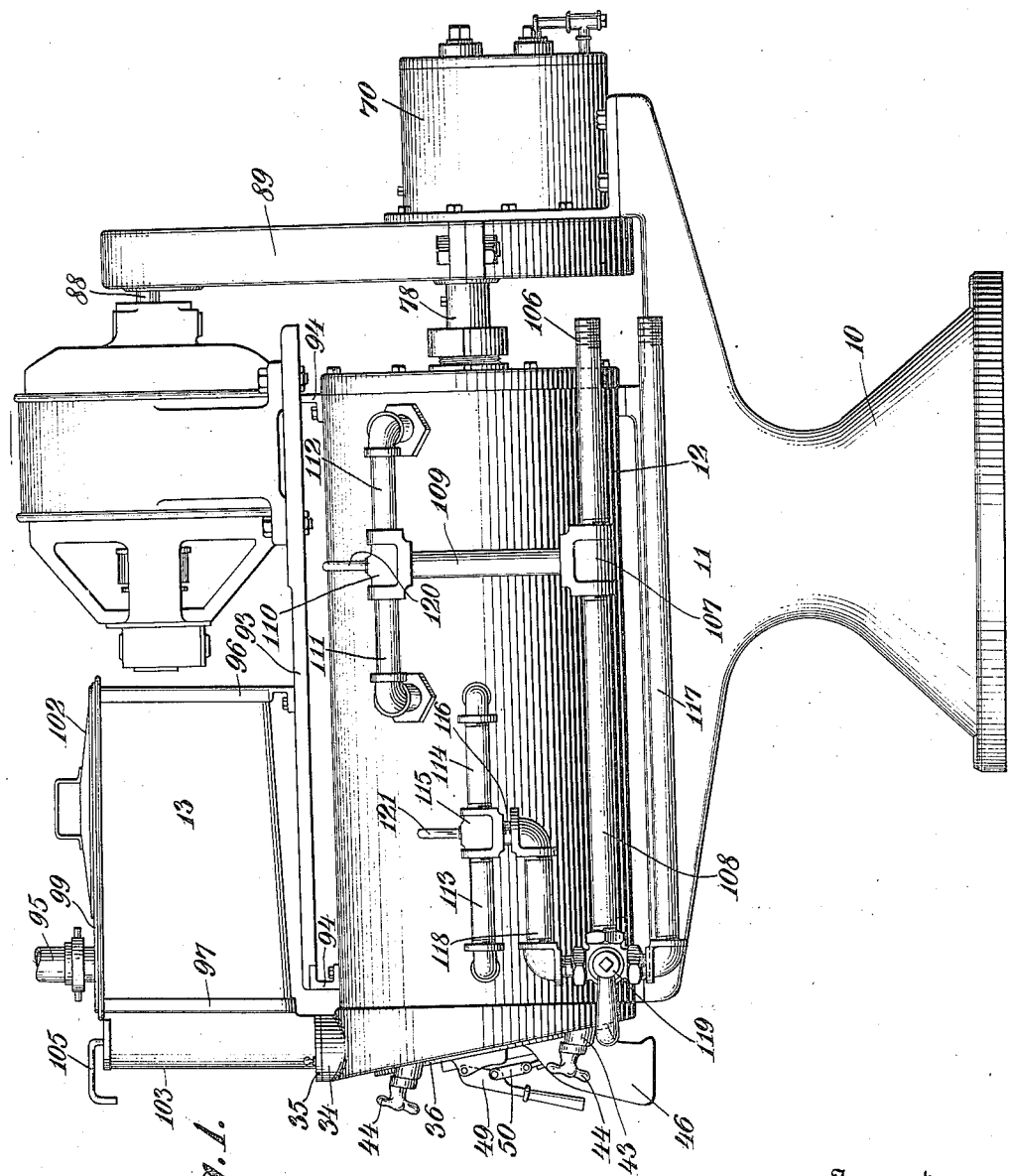

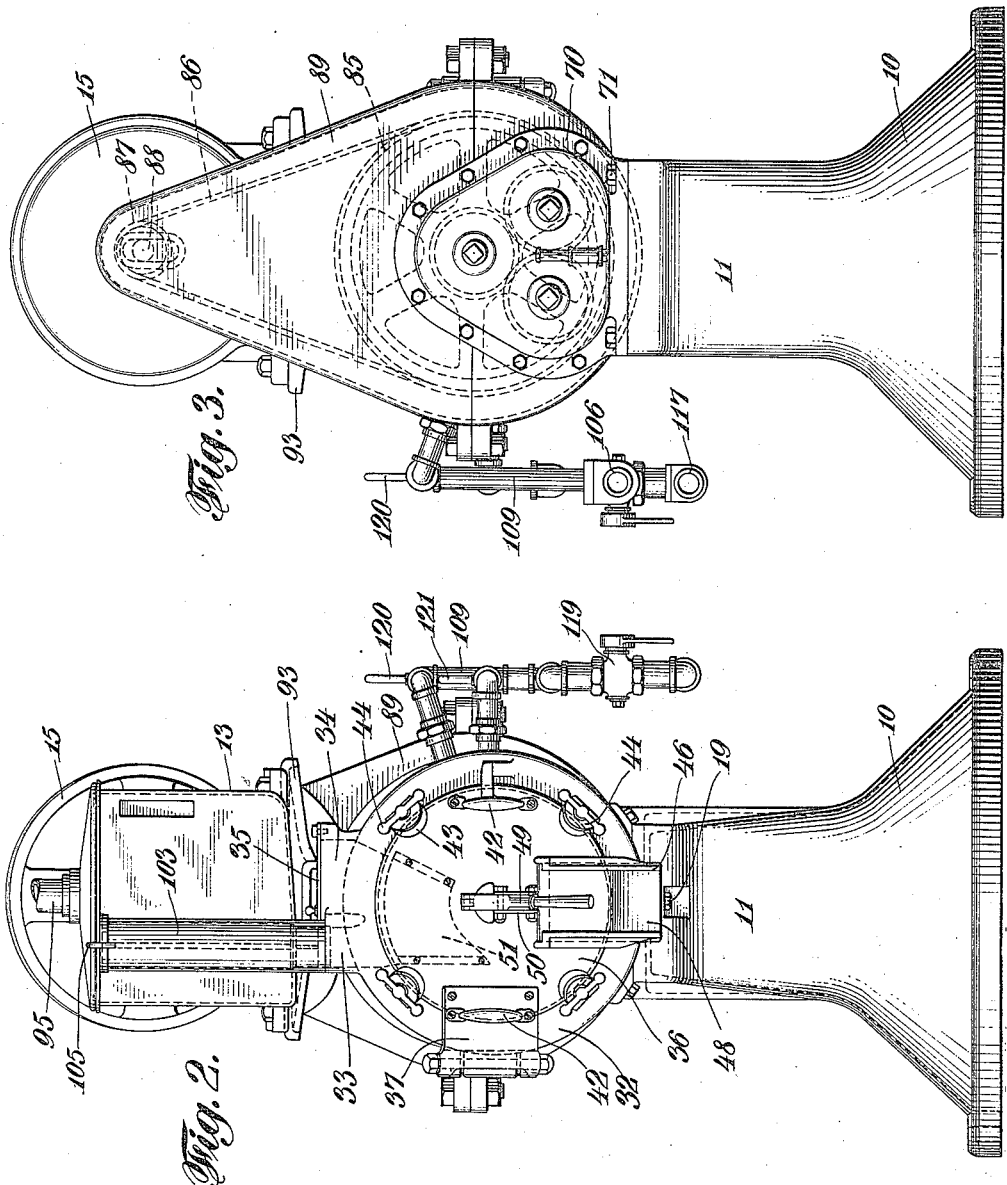

C. G. WENNERSTROM.
ICE CREAM FREEZER.
FILED SEPT. 17, 1921.

Inventor
Carl Gustav Wennerstrom
By his Attorneys
Williams & Pritchard

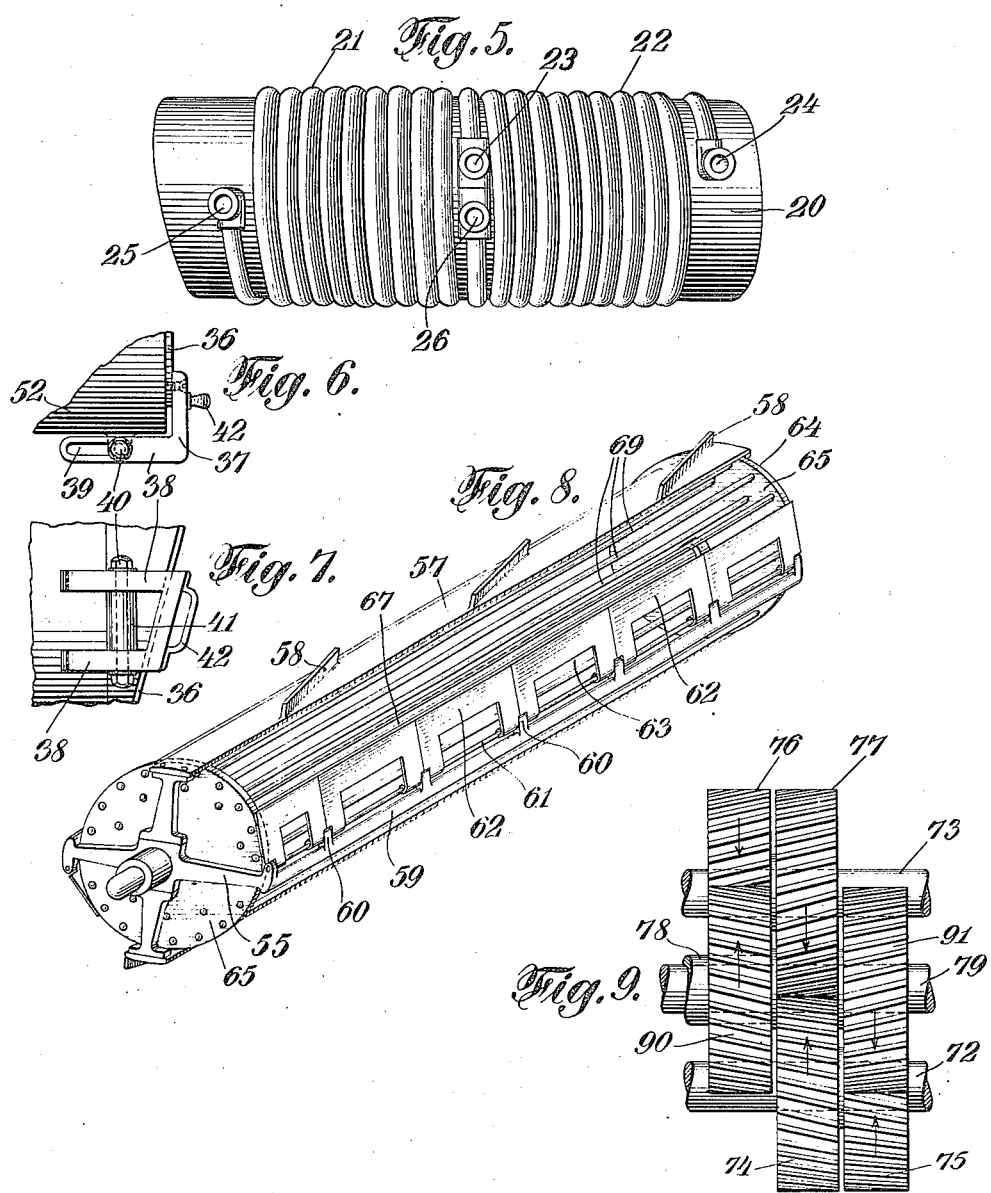

Patented Mar. 6, 1923.

1,447,497

UNITED STATES PATENT OFFICE.

CARL GUSTAV WENNERSTROM, OF CHICAGO, ILLINOIS, ASSIGNOR TO DAVIS-WATKINS DAIRYMEN'S MANUFACTURING COMPANY, OF NORTH CHICAGO, ILLINOIS, A CORPORATION OF DELAWARE.

ICE-CREAM FREEZER.

Application filed September 17, 1921. Serial No. 501,359.

*To all whom it may concern:*

Be it known that I, CARL GUSTAV WENNERSTROM, a subject of the King of Sweden, and a resident of the city of Chicago, county of Cook, and State of Illinois, have invented certain new and useful Improvements in Ice-Cream Freezers, of which the following is a specification.

This invention relates to ice cream freezers particularly of the horizontal type, in which a freezing coil is employed for circulating the freezing medium about the mixture to be frozen, and in which the freezing cylinder is provided with agitating means adapted to stir the mixture while it is being frozen, and ejecting the same after it has been reduced to the required frozen state.

In freezers of the type to which my invention relates it has been customary to employ a single freezing coil extending throughout or substantially throughout the entire length of the freezing cylinder. Such coils are objectionable in that the freezing medium, even though introduced at or below freezing point, heats up, while passing through the coil due to absorption of heat from the material to be frozen, to such an extent that the temperature at the outlet may be rendered much higher than at the inlet. In order therefore to maintain a temperature at the outlet sufficiently low to facilitate efficient operation of the machine it becomes necessary to introduce the freezing medium at a temperature so low that, even though affected during the passage of the freezing medium through the coil, it will be discharged at a temperature sufficiently low to facilitate freezing. After prolonged operation the freezing medium at the source of supply heats up and even though its temperature may be less than freezing it may not be sufficiently low to overcome the thermal action of the material to be frozen and consequently its temperature at the outlet will not be sufficiently low to cause freezing. If I substitute for the single coil, ordinarily used, a plurality of coils disposed about adjacent or adjoining freezing zones of the freezing chamber the freezing medium supplied to these coils individually is required to effect a cooling of only a relatively short freezing zone and consequently the temperature of the freezing medium is only slightly raised during its passage through the individual coils. Since the temperature of the freezing medium passing through these several coils is only slightly affected it follows that I am enabled to efficiently employ a freezing medium having a somewhat higher temperature than is ordinarily practical, thus making it possible to maintain an efficient operation of the machine even though the freezing medium at the source of supply has risen in temperature, as above mentioned, after long continued operation. Not only am I enabled to efficiently operate the machine with a freezing medium having a higher temperature than is practical when only a single coil is employed but I am enabled to maintain a substantially uniform temperature throughout the length of the freezing cylinder for the reason that, as above mentioned, the temperature of the freezing material is only slightly affected during its passage through the several coils as compared with the change in temperature of the freezing medium when passed through a single coil extending throughout or substantially throughout the entire length of the freezing cylinder.

An important object of the invention is to so construct and incorporate in the machine of the class mentioned the important and essential elements thereof as to provide a neat, compact and durable device which is safe, economical, reliable and capable of being efficiently operated with a freezing medium introduced at a relatively high temperature.

Other objects of my invention will become apparent from a study of the following description in connection with the accompanying drawings, in which—

Figure 1 is a side elevation of a machine built in accordance with my invention.

Figure 2 is an end view of the machine, the same being viewed from the left in Figure 1.

Figure 3 is an end view of the machine, the same being viewed from the right in Figure 1.

Figure 5 is a view in elevation showing an arrangement of brine coils.

Figure 6 is a plan view of a hinge particularly adapted to be used in connection with a machine embodying my invention.

Figure 7 is a side elevation of the hinge shown in Figure 6.

Figure 8 is a perspective view of an agitating mechanism.

Figure 9 is a plan view of a power transmission gearing.

Figure 4:
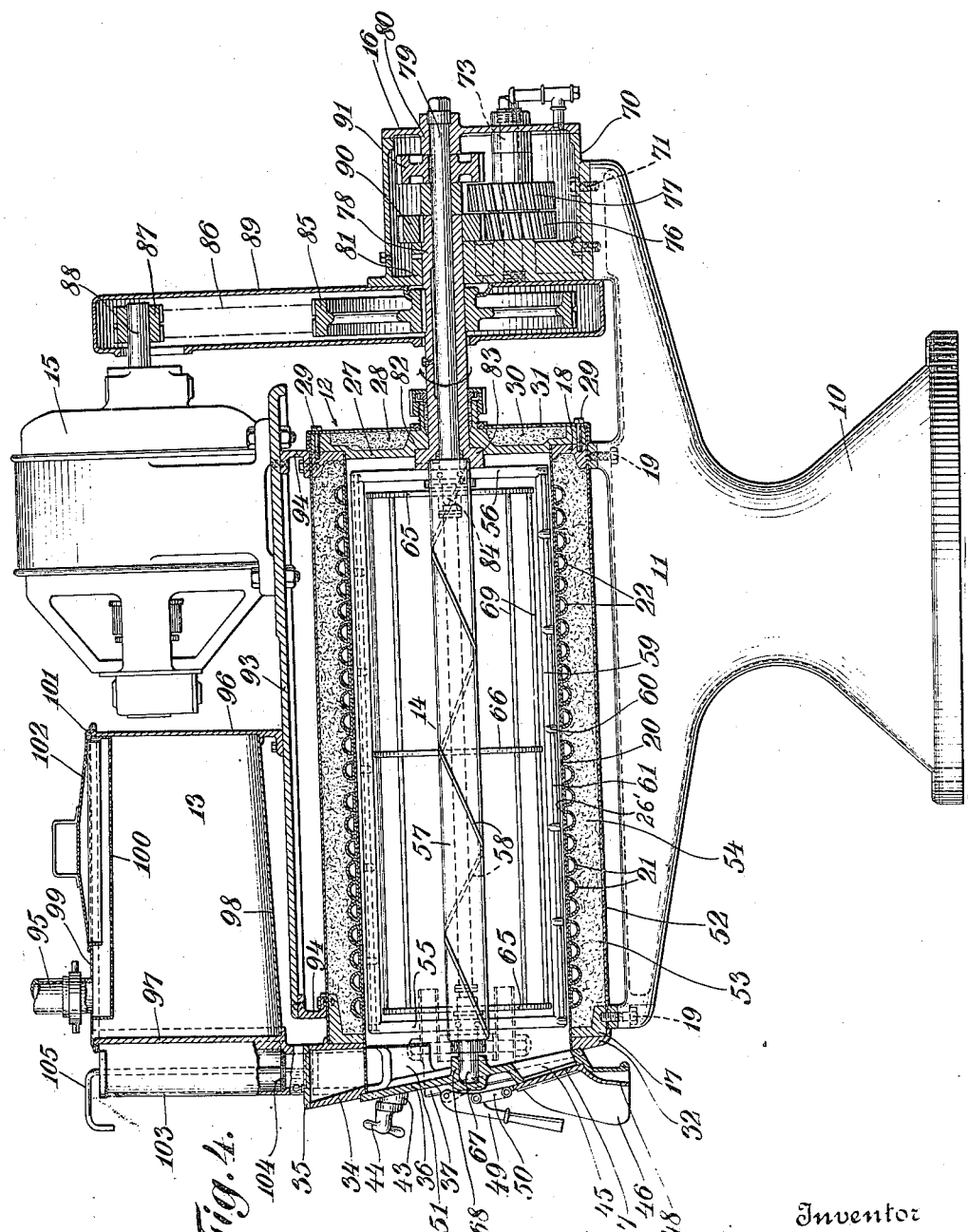
Figure 4 is a central vertical sectional view through the machine.

In the accompanying drawings wherein for the purpose of illustration is shown what I at present consider the preferred form of my invention, the numeral 10 indicates a base having an elongated head 11 upon which is mounted a freezer unit 12 adapted to receive its supply of mixture to be frozen from a supply tank 13, the cylinder being provided with an agitating mechanism 14 which derives its power of rotation from an electric motor 15 through the instrumentality of a power transmission 16.

The freezing unit 12 is so constructed as to provide a compact, durable, liquid tight, and highly insulated unit which comprises a pair of supporting rings 17 and 18 suitably connected to the head 11 by means of bolts or the like 19. These rings are preferably cast and are adapted to receive the outer ends of a freezing cylinder 20 about which is disposed a pair of brine coils 21 and 22 provided respectively with inlets 23 and 24 and with outlets 25 and 26, the coils being so formed or shaped as to present a substantially flat uninterrupted inner surface 26' which is maintained in an intimate contact with the freezing cylinder 20 substantially throughout the length of the same.

By reason of the fact that I employ a plurality of individual freezing coils, each of which surrounds only a relatively short portion of the freezing cylinder, I am enabled to efficiently operate the machine with a freezing medium having a relatively high temperature, as compared with the temperature which it is necessary to maintain in a freezing medium employed in similar machines having only a single coil extending throughout or substantially throughout the length of the freezing cylinder, inasmuch as the temperature of the freezing medium is not so materially affected during its passage through these relatively short coils as it would be otherwise, and consequently it may be introduced at a relatively higher temperature and yet be maintained at a freezing temperature throughout its length of travel. To the ring 18 is fitted a cylinder head 27 which is cut away to provide a chamber or cavity 28, the head 27 being suitably secured to the ring 18 by means of bolts 29. The chamber or cavity 28 is filled with a suitable insulating material such as cork or the like 30, which is retained therein by means of a cover plate 31, the cover plate 31 being retained in position by means of the bolts 29 which serve as hereinbefore stated to secure the head 27 to the ring 18. To the ring 17 there is fitted a cylinder head 32 which is provided with a passage 33 through which the mixture from the supply tank 13 is allowed to pass, and also with a hopper 34 carrying a cover plate 35. The hopper 34 is provided in order that any desired fruit may be deposited within the cylinder 20 when the mixture has become frozen to the proper degree, and also serves as a peep hole through which the condition of the mixture within the cylinder 20 may be observed while the same is being frozen. The head 32 is provided with a door or closure 36 carrying a hinge member 37 provided with arms 38 having slots 39 formed therein. The hinge member 37 is pivotally connected to the head 32 by means of a pin or bolt 40 passed through the slots 39 and an elongated lug 41 carried by the head 32 and disposed intermediate the arms 38. Due to the peculiar construction of the hinge member 37 the door 36 may be moved longitudinally with respect to the axis of the cylinder 20, by reason of the fact that the bolt or pin 40 is free to move within the slots 39 and may be subsequently swung about the bolt 40 as a pivot. This compound movement of the door which is made possible by the particular form of hinge employed is necessary in order that the same may be disengaged from the agitating mechanism 14, as will hereinafter more clearly appear. The door 36 is provided with a pair of handles 42 in order that its movement may be easily facilitated and is constructed with a plurality of lugs 43, preferably four in number, which are adapted to be engaged by a corresponding number of eccentric locking lugs 44 which are adapted to be actuated in the ordinary manner, to lock the door 36 in intimate engagement with the head 32 or release the same therefrom. The door 36 is further provided with an opening 45 through which the frozen material passes from the cylinder 20 into a spout 46, which is preferably formed integral with the door 36. As a means for closing the opening 45 I provide a slide valve or gate 47 having a guard flange 48. The valve or gate 47 is adapted to be moved by means of a suitable operating lever 49 pivotally connected to the head and having a link connection with the valve or gate 47 as shown at 50. To prevent the material from splashing out of the hopper 34 when the cover 35 is removed to deposit fruit within the cylinder 20, or to permit inspection of the contents of the cylinder 20, I provide a deflector plate 51 located beneath the hopper 34. The deflector plate 51 not only prevents the contents of the machine from being splashed out through the hopper 34 when the machine is operating but also serves to facilitate the feeding of the fruit into the cylinder 20 during the operation of the machine.

The cylinder 20 is jacketed with a suitable casing or covering 52 which is secured at its ends to the rings 17 and 18. The jacket or covering 52 is spaced an appreciable distance from the cylinder 20 to form a chamber 53 which is filled with a suitable cork insulation 54 which serves to insulate the coils 21 and 22.

The agitating means 14 located within the cylinder 20 comprises a pair of spiders 55 and 56 to which are connected ejector blade-carrying elements 57 provided with angularly disposed ejector blades 58. It will be noted that the ejector blades 58 carried by one of the blade-carrying elements 57 are angularly disposed with respect to the ejector blades carried by the opposite blade-carrying element as indicated in Figure 4, the blades being disposed in this manner in order to eject the frozen contents of the cylinder 20 when desired by the propeller action exerted thereupon when the machine as a whole is being operated. The arms intermediate those to which the blade-carrying elements 57 are connected are provided with elongated hinge plates 59 carrying a plurality of lugs 60 through which rods 61 are passed. To the rods 61 are hingedly connected a plurality of scraper blades 62 which are provided with relatively large openings 63, through which the frozen material is adapted to pass as it is scraped from the wall of the freezing cylinder 20, thus preventing a piling up of the material on the blades during the operation of the machine and thereby insuring a more perfect mixing of the same during the process of freezing. It is apparent that the scraper blades 62 are free to move slightly about the rods 61 to which they are hingedly connected when the machine is operating, and that by reason of their independent movement a scraping action may be exerted upon the inner surface of the cylinder 20 regardless of any slight irregularity which may be present after prolonged use. And it is further apparent that any expansion or contraction of these scraper blades, due to either a rise or fall in temperature will not so distort them as to prevent an intimate contact thereof throughout their length with the inner surface of the cylinder 20. Between the spiders 55 and 56 there is disposed a cage dasher 64, the dasher being rotatably supported at its ends by the spiders 55 and 56, to which it is journaled. The dasher 64 comprises a pair of end plates 65 and an intermediate plate 66. The end plates 65 and the intermediate plate 66 are suitably connected to a shaft 67, one end of which is projected through the spider 55 and journaled within a suitable bearing 68 formed on the door 36. Through the end plates 65 and the intermediate plate 66 are passed a plurality of elongated rods 69. These rods serve not only to reinforce the agitating mechanism 14 as a whole, but serve primarily to effectively whip up the material to be frozen as the machine is operated.

The transmission mechanism 16 which serves as a medium for delivering power of rotation to the agitating mechanism 14 from the motor 15 comprises a housing 70 suitably connected to the head 11 by means of bolts or the like 71 within which is disposed a pair of shafts 72 and 73 to which are respectively secured gears 74, 75, 76 and 77. These gears serve to rotate the concentric shafts 78 and 79 as will hereinafter more clearly appear. The shaft 79 as clearly shown in Figure 4 is journaled at one end in a suitable bearing 80 provided by the housing 70 and is free to rotate with respect to the shaft 78 which is journaled in bearings 81 and 82 provided respectively by the housing 70 and the cylinder head 27. That end of the shaft 78 which is disposed within the cylinder 20 is provided with an enlarged head 83 which is so interlocked with the spider 56 as to rotate the spiders 55 and 56 carrying the ejector blades 58 and scraper blades 62 and yet permit disengagement therewith when desired in order that the agitating mechanism 14 as a whole may be removed from the cylinder 20 as is customary in freezers of this particular type. It will be noted that the shaft 79 extends through the spider 56 and is free to rotate with respect thereto in order that a suitable driving connection as shown at 84 may be maintained between the shaft 79 and the end plate 65 of the dasher 64, the connection thus afforded between the dasher 64 and the shaft 79 being such that the agitating mechanism 14 as a whole may be easily removed from the cylinder 20 when disconnected from the head 83 as above mentioned. The shaft 78 is driven in the direction indicated by the arrow in Figure 4 by a direct connection with the motor 15, through the instrumentality of a sprocket 85 keyed to the shaft 78 and connected by means of a sprocket chain or belt 86 to a driving pinion 87 carried by the motor shaft 88, the driving elements intermediate the motor and the shaft 78 being housed in a suitable oil tight casing 89. The shaft 78 is provided with a gear 90 meshing with gear 76 which serves to rotate the gears 76, 77, 74 and 75 in the direction indicated by the arrows shown respectively thereon. The gear 75 meshes with a gear 91 which is suitably connected to the shaft 79 and rotated in the direction of the arrow shown thereon. By the arrangement of gears above referred to, it is apparent that the cage dasher 64 is rotated in one direction, whereas the spiders 55 and 56 carrying the ejector blades 58 and the scraper blades 62 are rotated in an opposite direction, thereby insuring a complete mixing of the contents of the cylinder 20 during the operation of the machine.

The supply tank 13 from which the cylinder 20 receives the mixture to be frozen, is mounted upon a supporting plate 93 carried by brackets 94 suitably secured to the rings 17 and 18. The supporting plate 93 serves not only as a support for the supply tank 13 but also as a support for the motor 15 and functions co-operatively with the head 11 as a means for bracing the rings 17 and 18 against longitudinal displacement with respect to the axis of the freezing cylinder 20, and tying together the several elements, comprising the freezing unit into a rigid compact structure, eliminating the use of tie rods and other reinforcing means usually employed in freezers of this particular type. The tank 13, receiving its supply from a suitable source through a supply pipe 95, comprises end members 96 and 97 to which is secured a metallic sheet 98 bent to form the body portion of the tank. The top 99 of the tank is provided with a screen or strainer 100 through which the material to be frozen is passed in order to remove any foreign matter which may be present as it enters the tank 13. In order that the interior of the tank 13 may be readily inspected or cleaned the top 99 is provided with a relatively large opening 101, for which is provided a removable closure 102. The end 97 of the tank is formed with a chamber 103, the lower end of which is supported upon the cylinder head 32. The chamber 103 communicates with the supply tank 13 and is adapted to communicate with the cylinder 20 when the valve 104 carrying the valve stem 105 seated at the lower end of the chamber 103 is lifted to permit a predetermined quantity of mixture carried within the supply tank 13 to pass therefrom and into the cylinder 20 through the passage 33.

The brine or other suitable freezing medium is supplied to the coils 21 and 22 through a supply pipe 106 connected to a suitable source of supply, the supply pipe 106 being provided with a T connection 107, to which is connected a shunting pipe 108 and a delivery pipe 109. To the delivery pipe 109 is connected a T joint 110 from which a pair of intake pipes 111 and 112 branch. The intake pipes 111 and 112 are passed through the casing 52 and connected respectively to the intake openings 23 and 24 of the coils 21 and 22. The brine or other freezing medium passing through the coils 21 and 22 is delivered through their respective outlet openings 25 and 26 to a pair of discharge pipes 113 and 114 connected to a T joint 115. The freezing medium passing from the coils 21 and 22 through the discharge pipes 113 and 114 is brought together in a single pipe 116 and is directed into the return pipe 117 through an intermediate pipe section 118. For controlling the circulation of the freezing medium through the coils 21 and 22 I provide an ordinary type of two-way valve 119 which is adapted to communicate with the pipes 108, 117 and 118. By proper manipulation of the valve 19 the quantity of freezing medium passing through the coils 21 and 22 may be varied to any required amount. Should it be desired to circulate the entire supply passing through the pipe 106 and through the coils 21 and 22, communication between pipes 108 and 117 is severed and at the same time communication between pipes 117 and 118 is fully established, so that any passage of the freezing medium from pipe 106 through pipe 108 to the return pipe 117 is prevented, whereupon the total quantity of the brine or other freezing medium passing through pipe 106 is forced necessarily to pass through the pipe 109 into the coils 21 and 22 from which it returns to the pipe 117 through the pipes 113, 114, 116 and 118. Should it be desired to discontinue the circulation of the brine or other freezing medium through the coils 21 and 22, the valve 119 is moved to sever communication between pipes 118 and 117, and at the same time establish communication between pipes 108 and 117, whereupon the total supply of freezing medium passing through pipe 106 is directed therefrom into the return pipe 117 through the pipe 108. It is apparent that should it be desired to circulate a quantity of the freezing medium through the coils 21 and 22 intermediate maximum and minimum amounts, the valve 119 may be set to allow a portion of the freezing medium to be shunted through the pipe 108 into the return pipe 117, and at the same time permit a certain quantity of the freezing medium to pass from the coils 21 and 22 through the pipes 113, 114, 116 and 118 into the return pipe 117. The quantity of the freezing mixture which it is desired to pass through the coils 21 and 22 while the material within the cylinder 20 is being frozen, is determined to a marked degree by the temperature reading shown by the thermometers 120 and 121 carried respectively by the T joints 110 and 115 through which the freezing medium passes respectively into and out of the coils 21 and 22. By observing the readings of these thermometers the operator is enabled to so adjust the valve 119 as to maintain at all times during the freezing of the material within the cylinder 20 the temperature within the freezer necessary to its most efficient operation.

I claim:

1. An ice cream freezer comprising a freezing cylinder, a rotatable agitating mechanism arranged within said cylinder, a closure for said cylinder having a bearing for said agitating mechanism, a connection between said closure and cylinder adapted to permit a longitudinal movement of the closure with respect to the cylinder, and a subsequent swinging movement thereof with respect to said cylinder.

2. An ice cream freezer comprising a freezing cylinder, a rotatable agitating mechanism arranged within said cylinder, a closure for said cylinder having a bearing for said agitating mechanism, means for connecting said closure with said cylinder so as to permit a longitudinal and a swinging movement of the same with respect to the cylinder, said means comprising a pair of hinge members slidably and hingedly connected together.

3. An ice cream freezer comprising a freezing cylinder, an agitating mechanism located within said cylinder, a cylinder head having a mixture supply entrance therein, and a guard arranged within said cylinder adjacent said entrance to prevent the contents of the freezer from entering the mixture supply entrance from the freezer cylinder during the operation of the agitating mechanism.

4. An ice cream freezer comprising a freezing cylinder adapted for the reception of material to be frozen, an agitating mechanism located within said cylinder, said agitating mechanism comprising rotatable elements, a hinge plate connected to said rotatable elements and arranged longitudinally with respect to the axis of said cylinder, a plurality of relatively short scraper blades hingedly connected to said hinge plate in an end to end relation and adapted to remove frozen material from the wall of said freezing cylinder, said scraper blades being cut away to provide relatively large openings therein, and means for rotating said agitating mechanism.

5. An ice cream freezer comprising a freezing cylinder, an agitating mechanism located within said freezing cylinder, said agitating mechanism comprising rotatable elements, blade carrying elements connected to said rotatable elements and arranged longitudinally of the axis of said cylinder ejector blades connected to said blade carrying elements said blades being disposed angularly with respect to the axis of said cylinder, hinge plates connected to said rotatable elements and arranged longitudinally with respect to the axis of said cylinder, a plurality of scraper blades hingedly connected to said hinge plates in an end to end relation, and means for rotating said agitating mechanism.

6. An ice cream freezer comprising a freezing cylinder, rotatable elements arranged within said cylinder, a plurality of scraper blades connected to said rotatable elements, a dasher rotatably mounted intermediate said rotatable elements, said dasher comprising a plurality of discs, a plurality of whipping elements in the form of longitudinally disposed rods connected to said discs, and means for rotating said rotatable elements and said dasher.

7. An ice cream freezer comprising a freezing cylinder, rotatable elements arranged within said cylinder, a plurality of scraper blades connected to said elements, a dasher rotatably mounted intermediate said rotatable elements, said dasher comprising a plurality of circular members, a plurality of whipping elements connected to said circular members at a point adjacent their periphery, and means for rotating said rotatable elements and said dasher.

8. An ice cream freezer comprising a freezing cylinder, rotatable elements arranged within said cylinder, a plurality of scraper blades connected to said rotatable elements, a dasher rotatably mounted intermediate said rotatable elements, said dasher comprising a plurality of plates, a plurality of whipping elements in the form of longitudinally disposed rods connected to said rotatable member, and means for rotating said rotatable elements and said dasher in opposite directions.

9. An ice cream freezer comprising a freezing cylinder, a closure for said cylinder having a journal provided thereon, a plurality of rotatable elements arranged within said cylinder, scraper blades carried by said rotatable elements, a dasher arranged intermediate said rotatable elements and adapted to rotate with respect thereto, said dasher comprising a plurality of rotatable members, a shaft connected to said rotatable members, one end of said shaft being journaled to said closure, a plurality of whipping elements connected to said rotatable members, said whipping elements being in the form of longitudinally disposed rods, means for rotating said rotatable elements, and means for rotating said dasher with respect to said rotatable elements.

10. An ice cream freezer comprising a freezing cylinder, an agitating mechanism arranged within said cylinder, said agitating mechanism comprising separate rotatable units journaled to each other and adapted to rotate with respect to each other, a pair of concentric shafts adapted for driving engagement with said rotatable units, a driving gear carried by one of said shafts, a driven gear connected to the other of said shafts, a motor operatively connected to the shaft carrying the driving gear, and a train of gears operatively connecting the gear of one shaft with the gear of the other shaft.

11. An ice cream freezer comprising a freezing cylinder, an agitating mechanism arranged within said cylinder, said agitating mechanism comprising separate rotative units journaled to each other and adapted to rotate with respect to each other, a pair of concentric shafts adapted for driving engagement with said rotatable units, a driving gear carried by one of said shafts, a driven gear connected to the other of said shafts, a motor operatively connected to the shaft carrying the driving gear, a pair of shafts arranged in a parallel relation with respect to each other and with respect to said concentric shafts, and a plurality of gears carried by said parallel shafts for transmitting power of rotation from said driving gear to said driven gear.

12. An ice cream freezer comprising a base, a freezing cylinder, supporting elements carried at the ends of said cylinder, said supporting elements being connected to said base, a motor supporting base secured to said supporting elements, a motor carried by said motor supporting base, and means operatively connecting said motor with said agitating mechanism.

13. An ice cream freezer comprising a base, a plurality of concentric cylinders, a pair of rings for spacing and supporting said cylinders, said rings being secured to said base, and a plate secured to said rings, said plate functioning co-operatively with said base to retain said rings in position against movement thereof.

14. A motor driven ice cream freezer comprising a base, a plurality of concentric cylinders, a pair of rings for spacing and supporting said cylinders, said rings being secured to said base, and a motor supporting plate secured to said rings, said plate functioning co-operatively with said base to retain said rings in position against longitudinal movement thereof.

15. In a cylindrical ice cream freezer, a base, a pair of rings mounted on said base, a plurality of cylinders spaced from one another by said rings, a plate secured to said rings on the opposite side of the base, a supply tank, and a motor mounted on said plate.

16. An ice cream freezer comprising a base, a freezing cylinder, a pair of head and supporting rings surrounding said cylinder at its ends, said rings being secured to said base, a jacket surrounding said cylinder, said jacket being secured to said rings and spaced from said cylinder, a freezing coil arranged between said jacket and cylinder, insulating material surrounding said coil, cylinder heads secured to said rings, a motor support secured to said rings, and a motor mounted upon said motor support, said motor being operatively connected to said agitating mechanism.

17. An ice cream freezer comprising a freezing cylinder, heads for said cylinder, one of said heads being provided with a passage through which said cylinder is adapted to receive the material to be frozen, a tank supporting base secured to said heads, and a supply tank mounted upon said tank support said tank having an outlet passage adapted to communicate with the passage in said head, and a valve adapted to sever connection between said tank and said cylinder.

18. An ice cream freezer comprising a freezing cylinder, heads for said cylinder, one of said heads being provided with a passage through which said cylinder is adapted to receive the material to be frozen, a tank supporting base secured to said heads, and a supply tank mounted upon said tank support, said tank having an outlet passage adapted to communicate with the passage in said head, a valve adapted to sever communication between said tank and said cylinder, an agitating mechanism arranged within said cylinder, a motor supported by said tank supporting base, and means operatively connecting said motor with said mechanism.

19. An ice cream freezer comprising a freezing cylinder, rotatable elements arranged within said cylinder, a plurality of scraper blades connected to said rotatable elements, a dasher rotatably mounted intermediate said rotatable elements, said dasher comprising a plurality of rotatable members, and a plurality of whipping elements connected to said rotatable members, said whipping elements being in the form of longitudinally disposed rods.

20. An ice cream freezer comprising a freezing cylinder, a closure for said cylinder having a journal provided thereon, a plurality of rotatable elements arranged within said cylinder, scraper blades carried by said rotatable elements, a rotatable dasher arranged intermediate said rotatable elements, said dasher comprising a plurality of rotatable members, a shaft connected to said rotatable members, one end of said shaft being journaled to said closure, and a plurality of whipping elements connected to said rotatable members, said whipping elements being in the form of longitudinally disposed rods.

21. An ice cream freezer comprising a freezing cylinder adapted for the reception of the material to be frozen, an agitating mechanism located within said cylinder, said agitating mechanism comprising rotatable elements, a hinge plate connected to said rotatable elements and arranged longitudinally with respect to the axis of said cylinder, a plurality of relatively short scraper blades hingedly connected to said hinge plate in an end to end relation and adapted to remove frozen material from the wall of said freezing cylinder, said scraper blade being cut away to provide relatively large openings therein, a dasher rotatably mounted intermediate said rotatable elements, said dasher comprising a plurality of rotatable members, a plurality of whipping elements connected to said rotatable members, and means for rotating said agitating mechanism.

22. An ice cream freezer comprising a freezing cylinder adapted for the reception of the material to be frozen, an agitating mechanism located within said cylinder, said agitating mechanism comprising rotatable elements, a hinge plate connected to said rotatable elements and arranged longitudinally with respect to the axis of said cylinder, a plurality of relatively short scraper blades hingedly connected to said hinge plate in an end to end relation and adapted to remove frozen material from the wall of said freezing cylinder, said scraper blade being cut away to provide relatively large openings therein, a dasher rotatably mounted intermediate said rotatable elements, said dasher comprising a plurality of rotatable members, a plurality of whipping elements connected to said rotatable members, and means for rotating said agitating mechanism and said dasher.

23. An ice cream freezer comprising a freezing cylinder, an agitating mechanism located within said freezing cylinder, said agitating mechanism comprising rotatable elements, blade carrying elements connected to said rotatable elements and arranged longitudinally with respect to the axis of said cylinder, ejector blades connected to said blade carrying elements, said blades being disposed angularly with respect to the axis of said cylinder, hinge plates connected to said rotatable elements and arranged longitudinally with respect to the axis of said cylinder, a plurality of scraper blades hingedly connected to said hinge plates in an end to end relation, a dasher rotatably mounted intermediate said rotatable elements, said dasher comprising a plurality of rotatable members, a plurality of whipping elements connected to said rotatable members, said whipping elements being in the form of elongated rods horizontally disposed with respect to the axis of said cylinder, and means for rotating said rotatable elements and said dasher.

24. An ice cream freezer comprising a freezing cylinder, an agitating mechanism located within said freezing cylinder, said agitating mechanism comprising rotatable elements, blade carrying elements connected to said rotatable elements and arranged longitudinally with respect to the axis of said cylinder, ejector blades connected to said blade carrying elements, said blades being disposed angularly with respect to the axis of said cylinder, hinge plates connected to said rotatable elements and arranged longitudinally with respect to the axis of said cylinder, a plurality of scraper blades hingedly connected to said hinge plates in an end to end relation, a dasher rotatably mounted intermediate said rotatable elements, said dasher comprising a plurality of rotatable members, a plurality of whipping elements connected to said rotatable members, said whipping elements being in the form of elongated rods longitudinally disposed with respect to the axis of said cylinder, and means for rotating said rotatable elements and said dasher.

In testimony whereof, I have affixed my signature to this specification.

CARL GUSTAV WENNERSTROM.